United States Patent
Gnech et al.

(10) Patent No.: US 9,037,467 B2
(45) Date of Patent: May 19, 2015

(54) SPEECH EFFECTS

(71) Applicant: INTERNATIONAL BUSINESS MACHINES CORPORATION, Armonk, NY (US)

(72) Inventors: Thomas H. Gnech, Herrenberg (DE); Steffen Koenig, Saint Leon-Rot (DE); Oliver Petrik, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 220 days.

(21) Appl. No.: 13/718,241

(22) Filed: Dec. 18, 2012

(65) Prior Publication Data

US 2013/0173253 A1 Jul. 4, 2013

(30) Foreign Application Priority Data

Jan. 2, 2012 (EP) .................................. 12150007

(51) Int. Cl.
*G10L 15/00* (2013.01)
*G06F 17/28* (2006.01)
*G10L 21/18* (2013.01)
*G10L 21/10* (2013.01)
*G10L 21/16* (2013.01)

(52) U.S. Cl.
CPC .................. *G06F 17/28* (2013.01); *G10L 21/10* (2013.01); *G10L 21/16* (2013.01); *G10L 21/18* (2013.01)

(58) Field of Classification Search
USPC ....................................... 704/10, 260; 434/116
See application file for complete search history.

(56) References Cited

U.S. PATENT DOCUMENTS

| | | | |
|---|---|---|---|
| 6,334,104 B1 * | 12/2001 | Hirai .............................. | 704/258 |
| 6,424,943 B1 | 7/2002 | Sherwood et al. | |
| 7,739,116 B2 | 6/2010 | Miyamoto et al. | |
| 2007/0088712 A1 * | 4/2007 | Watson et al. .................. | 707/10 |
| 2010/0041000 A1 | 2/2010 | Glass et al. | |
| 2010/0145705 A1 * | 6/2010 | Kirkeby ........................ | 704/260 |
| 2012/0196260 A1 * | 8/2012 | Nhiayi .......................... | 434/317 |
| 2013/0131849 A1 * | 5/2013 | Mere .............................. | 700/94 |

* cited by examiner

*Primary Examiner* — Daniel D Abebe
(74) *Attorney, Agent, or Firm* — Margaret McNamara, Esq.; Blanche E. Schiller, Esq.; Heslin Rothenberg Farley & Mesiti P.C.

(57) ABSTRACT

A method of complementing a spoken text. The method including receiving text data representative of a natural language text, receiving effect control data including at least one effect control record, each effect control record being associated with a respective location in the natural language text, receiving a stream of audio data, analyzing the stream of audio data for natural language utterances that correlate with the natural language text at a respective one of the locations, and outputting, in response to a determination by the analyzing that a natural language utterance in the stream of audio data correlates with a respective one of the locations, at least one effect control signal based on the effect control record associated with the respective location.

20 Claims, 7 Drawing Sheets

FIG. 9

SPEECH EFFECTS

PRIOR FOREIGN APPLICATION

This application claims priority from European patent application number 12150007.8, filed Jan. 2, 2012, which is hereby incorporated herein by reference in its entirety.

BACKGROUND

One or more aspects relate to a method of complementing a spoken text, a system for complementing a spoken text, a corresponding computer program product, as well as an effect-complemented text document.

It is known to read natural language texts aloud, e.g. as a speech, a business presentation or for the amusement of children.

BRIEF SUMMARY

Shortcomings of the prior art are overcome and additional advantages are provided through the provision of a method of complementing a spoken text. The method includes, for instance, receiving text data representative of a natural language text; receiving effect control data comprising at least one effect control record, each effect control record being associated with a respective location in said natural language text; receiving a stream of audio data; analyzing said stream of audio data for natural language utterances that correlate with said natural language text at a respective one of said locations; and outputting, in response to a determination by said analyzing that a natural language utterance in said stream of audio data correlates with a respective one of said locations, at least one effect control signal based on the effect control record associated with the respective location.

Systems and computer program products relating to one or more aspects are also described and may be claimed herein.

Additional features and advantages are realized through the techniques described herein. Other embodiments and aspects are described in detail herein and are considered a part of the claimed aspects.

DETAILED DESCRIPTION

One or more aspects teach a method of complementing a spoken text. The method makes use of effect data associated with a natural language text. Real-time audio data representative of a person reading the natural language text is analyzed by a speech recognition device. At locations in the natural language text that are associated with effect actions by the effect data, commands for effecting the effect actions are issued to a corresponding effect device. The effect actions may comprise e.g. stopping, starting or modifying an effect. A user, e.g. the reader and/or a listener, may influence which specific effect is associated with a particular effect action. Moreover, the specific effect associated with a particular effect action may be dependent on location.

In one aspect, as touched upon supra, one or more aspects relate to a method of complementing a spoken text. One aspect comprises, for instance, receiving text data representative of a natural language text. For example, the text data may represent the natural language text in any combination of Unicode, ASCII, XML format, Microsoft-Word format, .txt format and/or in .rtf format, etc. The natural language text need not be limited to a single story or speech, but may include any number of stories, speeches, etc. Similarly, the natural language text need not be limited to a single natural language, but may include text from any number of languages.

In one or more aspects, the term "receiving" may comprise receiving/obtaining the respective data/element/information from a storage medium, via a computer network and/or by user input. In one or more aspects, any "receiving" may be accompanied by a "storing" of the received data/element/information, e.g. in a computer memory, on a hard disk, in a flash storage device or in any other storage device. In other words, where the method comprises a receiving of an element/data/information, the method may comprise a storing of the received element/data/information.

One or more aspects comprise receiving effect control data.

The effect control data may comprise data representative of effect-related actions. For example, the effect control data may comprise data defining a controlling of one or more effect devices, e.g. data for signaling or for generating signals to one or more effect devices to carry out a specified action, e.g. for signaling or for generating signals to one or more effect devices to produce, to cease producing and/or to modify production of one or more specified effects.

Similarly, the effect control data may comprise data specifying the availability and/or the respective capabilities of one or more effects devices, e.g. specifying whether the respective effect device is capable of audio, visual and/or haptic output. Similarly, the effect control data may specify capabilities such as the resolution of an effect device capable of visual output, the wattage of an effect device capable of audio output and/or define the availability of specific effect devices such as stroboscopes, sound effect devices, fog machines, etc.

Similarly, the effect control data may comprise venue data that specifies the effect devices respectively available at each of one or more locales, e.g. the effect devices available in a given conference room, theater, domestic room, etc.

Moreover, the effect control data may comprise data that defines one or more groups of effects, e.g. that assigns one or more specific effects and/or one or more types of effects to one or more groups. For example, the effect control data may comprise data that defines a group of effects that may be considered suitable for preschoolers. Similarly, the effect control data may comprise data that defines a group of effects that may be considered unsuitable for preschoolers, e.g. stroboscope effects or sound effects that exceed conversational volume.

In the context of one or more aspects, the term "effect device" may be understood broadly in the sense of any device that is capable of sensorily perceptible output, e.g. audio, visual and/or haptic output. The output may be selectively operable, i.e. may only occur in response to a corresponding output command. The term "effect device" may be thus understood as including, but not limited to, an audio output device, a display device, a visual effect output device, a haptic output device, an olfactory output device, a heating device, a cooling device, a moving platform, a cell phone, a portable audio reproduction device, and a tablet computing device. Similarly, the term "effect device" may be understood in the sense of a system comprising any combination of such devices. For example, a text being read out loud by a parent from a tablet computing device to a child may be complemented by images and/or sound effects produced by the tablet computing device. Similarly, a sales presentation or theatrical performance being held before a large audience may be complemented by effects produced by a professional-grade effect system including e.g. a professional-grade audiovisual system, an olfactory output device, etc. In the case of a theatrical performance, the effect system may include fog machines, stroboscopes, a seat shaking mechanism, wind machines, heating/cooling devices, etc. Likewise, a business presentation being held before a group of colleagues may be complemented by graphic images presented on the colleagues' individual tablet computing devices as well as by music provided via an audiovisual system built into the conference room.

The effect control data may comprise at least one effect control record. In the context of one or more aspects, the term "record" may be understood in the sense of a set of individual data values that constitute elements of a single instance of a data structure or that are otherwise associated so as to constitute a single logical entity.

One or more or each of the effect control records may comprise data representative of one or more effect-related actions with respect to one or more effects. For example, an effect control record may comprise data representative of a "fog machine OFF" command or may comprise data representative of both a "fog machine ON" command and a "stroboscope ON" command. One or more or each of the effect control records may specify at least one of an effect ID, an effect type and an effect action. For example, an effect type may be "audio." An effect ID may uniquely specify an effect or a class of effects, e.g. a "howling wolves" sound. An effect action may be an "ON" or "OFF" or "SET VOLUME: WHISPERING VOLUME" action, for instance. Moreover, an effect control record may comprise data specifying a duration of an action, e.g. a duration of an effect.

One or more or each of the effect control records may be associated with a respective location in the natural language text. In other words, one or more locations in the natural language text may have one or more effect control records associated with the respective location. Accordingly, one or more or each of the effect control records may include a reference to an associated location in the natural language text. For example, an effect control record may include a data value that specifies a location in the natural language text by specifying a word count designating the location in the natural language text. The term "location" may also be understood in the sense of a passage of text. Accordingly, an effect control record may include data values that specify a location/passage in the natural language text by specifying a word count at which the location/passage begins and a word count at which the location/passage ends in the natural language text. Similarly, an effect control record may specify an associated location in the natural language text by including a data value constituting a reference to another effect control record associated with the same location.

The text data and any of the effect control data, e.g. one or more effect control records, may be constituent elements of a single data entity. Such a data entity may be termed an effect-complemented text document or an enhanced (electronic) text document.

One or more aspects may comprise, for instance, receiving a stream of audio data, i.e. data representative of an audio signal. Each received stream of audio data may be part of a larger stream of audio data. For example, each received stream of audio data may represent a segment (e.g. on the order of several milliseconds or seconds) of a stream of audio data representative of a reading of a story (e.g. having a length on the order of several minutes or several tens of minutes). Accordingly, the receiving of a stream of audio data may comprise receiving individual portions of a (much larger) stream of audio data, e.g. receiving individual packets of audio data, which packets of audio data constitute parts of a (much larger) stream of audio data. As such, the receiving of a stream of audio data may be reiterated. In short, the term "stream of audio data" may be understood in one or more aspects in the sense of a stream of audio data representing (only) up to several seconds of an audio signal as well as in the sense of a stream of audio data representing several minutes or hours of an audio signal.

The audio data may comprise analog and/or digital audio data, e.g. audio data captured via a microphone, e.g. a microphone of a device that is also an effect device in the sense of one or more aspects. The audio data may be encoded, e.g. for the sake of (losslessly or lossily) reducing the size of the audio data. The stream of audio data may be a real-time stream of audio data, e.g. a real-time stream of audio data obtained by live capture of an audio signal or a real-time reproduction of a captured audio signal, e.g. playback of an audio recording. In the context of one or more aspects, the term "real-time" may designate that the audio data is streamed (when seen as a whole over the duration of the audio presentation) at essentially the same speed as the original presentation (e.g. ±5% or ±10%, even though the individual packets of the stream of audio data may be compressed and (intermittently) transmitted at a much higher data rate). In other words, notwithstanding compression/expansion of the data, the stream of audio data may deliver data at essentially the same rate as the audio data is produced at the original source. In yet other words, the stream of audio data may deliver data at a rate such that essentially instant reproduction of the incoming stream of audio data generates an audio signal that is perceived as being essentially identical to the original audio source. Similarly, the term "real-time" may designate that the stream of audio data is obtained by reproducing a captured audio signal at essentially the same speed as the original audio source (e.g. ±5% or ±10%).

One or more aspects may comprise, for instance, analyzing the stream of audio data for natural language utterances that correlate with the natural language text. For example, one aspect may comprises executing a speech recognition algorithm on the stream of audio data and correlating results of the speech recognition algorithm with the natural language text. In this respect, one aspect may include identifying the language(s) of the natural language text (e.g. by receiving a corresponding user input or by algorithm-based analysis of the natural language text) and setting parameters of the speech recognition algorithm so as to recognize the identified language(s).

The analyzing may comprise determining a value indicative of a current location in the natural language text, e.g. a location in the natural language text correlating to the most recently received audio data in the stream of audio data. For example, the analyzing may comprise determining (e.g. by means of a speech recognition algorithm) natural language utterances in the stream of audio data, determining a correlation between the natural language utterances and the natural language text and outputting a value indicative of a location in the natural language text correlating to the most recently received audio data in the stream of audio data. Since natural language utterances in the stream of audio data need not be identical to the natural language text (for example, the speech recognition algorithm might incorrectly interpret the audio data as a particular natural language utterance or the reader may skip or incorrectly speak the natural language text), the aforementioned correlation may be, but need not be a 1-to-1 correlation. Instead, in the context of one or more aspects, the term "correlation" may be understood in the sense of a "best match," e.g. the closest match between a (sequence of) respectively recognized natural language utterance(s) and the natural language text, or a "sufficient match," e.g. a match that fulfills a given measure of approximate equality, e.g. a match that exceeds a given apparent probability of correctness (e.g. a greater than 70%, 80%, 90% or even 95% likelihood of being correct as assessed within the limited context of the speech recognition algorithm, the stream of audio data and the natural language text).

More specifically, one or more aspects may comprise analyzing the stream of audio data for natural language utterances that correlate with the natural language text at a respective one of the locations (with which one or more effect control records are associated). For example, as touched upon above, the analyzing may comprise determining a value indicative of the current location in the natural language text. An aspect may comprise, for instance, determining, for one or more or all such values, whether the effect control data comprises a value equal to or otherwise matching the respective value indicative of the respective current location in the natural language text. Such a match may occur e.g. when the effect control data defines a passage in the natural language text, e.g. defines a beginning and an end of a passage, and the respective current location falls within that passage (e.g. the value indicative of the respective current location falls between the value defining the beginning and the value defining the end of the passage). Specifically, an aspect may comprise, for instance, determining, for one or more or all such values, whether the effect control data comprises an effect control record that comprises a value equal to or otherwise matching the respective value indicative of the respective current location in the natural language text.

An aspect may comprise, for instance, outputting at least one effect control signal, e.g. outputting at least one effect control signal based on an effect control record associated with the respective current location. Such an outputting may be effected in response to a determination, e.g. as described hereinabove, that a natural language utterance in the stream of audio data correlates with the natural language text, e.g. with a respective one of the locations (with which one or more effect control records are associated).

In the context of one or more aspects, the term "effect control signal" may be understood as a signal that, when received by an effect device, signals the effect device to take a particular action specified by the effect control signal, e.g. to produce, to cease producing and/or to modify production of one or more effects specified by the effect control signal. For example, an effect control signal may signal a fog machine to produce fog or to cease producing fog. Similarly, an effect control signal may signal a stroboscope to modify the frequency at which a strobe light is flashed or may signal a display device to display a graphic image stored at a location specified by the effect control signal.

The outputting of at least one effect control signal may comprise broadcasting a common set of effect control signals to a plurality of effect devices, transmitting a respective set of control signals to respective groups of effect devices and/or transmitting a respective, individual set of control signals to each of a plurality of effect devices. In this respect, as touched upon above, one or more aspects may comprise effecting, on at least one effect device, an action specified by a (corresponding) effect control signal.

One or more aspects may comprise, for instance, receiving effect device information from at least one effect device. One or more aspects may comprise, for instance, adding effect device information received from an effect device to the effect control data. The effect device information may be received via a wired or wireless connection. One or more aspects may comprise broadcasting or otherwise issuing a request for effect device information to at least one effect device. The issuance and reception of effect device information from at least one effect device may be in response to such a request. Similarly, an effect device may automatically issue effect device information in response to establishing a (new) connection with a system as described hereinbelow.

The effect device information may specify a general type and/or the general capabilities of the effect device, e.g. specify whether the effect device is an audio output device, a display device, a fog machine, etc. Similarly, the effect device information may specify an identification number that uniquely identifies an individual effect device and/or that uniquely identifies a model number of the effect device. Similarly, the effect device information may specify parameters associated with one or more effects that the respective effect device is capable of producing. For example, in the case of an audio system comprising surround sound capabilities, the effect device information may specify the wattage of the sound system and/or the relative location and the general frequency characteristics (e.g. sub-woofer) of the audio system's loudspeakers. Similarly, in the case of a display device, the effects device information may specify the resolution of the display device.

The outputting of at least one effect control signal may comprise determining whether an effect, e.g. an effect specified by a respective effect control record, is (currently) available, e.g. available via at least one effect device (connected with or comprised by a system as described hereinbelow). The determination of whether an effect is available may be based on effect device information received from at least one effect device and/or on the effect control data. The determination may comprise determining whether an effect specified by a respective effect control record associated with the current location (to which the most recently received utterance in the stream of audio data correlates in the natural language text) is available.

As discussed herein, one or more aspects may comprise analyzing the stream of audio data for natural language utterances that correlate with the natural language text at a respective one of the locations (with which one or more effect control records are associated). As such, one or more aspects may comprise determining that a natural language utterance in the stream of audio data correlates with a respective one of the locations. One or more aspects may comprise, for instance, determining (e.g. in response to such a determination), based on the effect control data, whether the respective (current) location is an expected next location. In other words, one or more aspects may comprise determining, relative to a second-most recent determination that a natural language utterance in the stream of audio data correlates with a respective one of the locations, whether the most recent determination that a natural language utterance in the stream of audio data correlates with a respective one of the locations is a determination that a natural language utterance in the stream of audio data correlates with the next one of the locations in the sequence of locations defined by the natural language text. If the current location is not the expected next location, then this is an indication that the reader has jumped backward/forward in their reading of the natural language text, depending on whether the current location is prior/subsequent to the second-most recent location in the sequence of locations defined by the natural language text.

If the determining reveals that the current location is not the expected next location, the outputting of at least one effect control signal may comprise outputting, for at least one running effect, a control signal to stop the running effect. For example, a stop control signal may be output for all effects or for all currently running effects that, as defined by the effect control data/the effect control records, should not be running at the current location. In this respect, one or more aspects may comprise maintaining a list of currently running effects.

If the determining reveals that the current location is not the expected next location, the outputting of at least one effect control signal may comprise outputting one or more control signals based on one or more effect control records associated with locations in the natural language text, which locations are prior to the current location in the sequence of locations defined by the natural language text, e.g. control signals with respect to effects that (e.g. as specified by the effect control data) persist through the current location. Accordingly, one or more aspects may comprise determining which control signals are to be output and/or which effects fulfill such criteria.

As described herein, one or more aspects may comprise outputting at least one effect control signal based on an effect control record associated with the respective current location (in the natural language text). Accordingly, one or more aspects may comprise determining which effect control signal(s) to output. This determination may be based not only on an effect control record associated with the respective current location, but also on any of a user input (e.g. input from a reader and/or a listener of the stream of audio data), the effect control data, information received from one or more of the effect devices and/or information obtained from external sources (e.g. from a venue effect database and/or the Internet). Such input/data/information (hereinafter simply "information" for the sake of simplicity) may specify that one or more substitute effects are to be employed in lieu of effects that are not available via the available effect devices. For example, a visual flashing effect may be specified as a substitute effect for a vibration effect. Similarly, such information may specify which specific effects are to be enacted by respective effect devices and/or may specify a set of effects from which the specific effects are to be chosen. For example, in the case of a business presentation, such information may specify that a low-resolution version of an image should be output as a visual effect if the respective effect device is a cell phone and that a high-resolution version of the image should be output if the respective effect device is a beamer or tablet computing device. Similarly, in the case of a guided tour through a museum, the tour guide may specify that all effects are to be chosen from a set of effects appropriate for the age group of the people being toured. For example, an audio effect simulating the roar of a dinosaur may be available in a quiet version for kids aged 6 to 12, in a bloodcurdling version for kids aged 12 to 16 and in a "normal," loud roar version for all other visitors. Similarly, the individual listeners to the stream of audio data may supply input that specifies a set of effects from which all effects are to be chosen.

The determination of which effect control signal(s) to output may be based on an effect ID and/or an effect type specified by a respective effect control record. For example, a user may specify that no audio effects are to be produced. Accordingly, no effect control signals of type "audio" would need to be output. Similarly, in the museum example supra, a unique effect ID in a respective effect control record could specify a "roaring dinosaur" effect. The actual audio clip to be reproduced by an audio effect device could then be selected from a set of "roaring dinosaur" clips associated with the unique effect ID based on the user input, the set comprising a customized clip for each of the three age groups. Similarly, the respective effect control record and/or the set of "roaring dinosaur" clips may specify that, in the case of kids aged 12 to 16, a surround sound version of the "bloodcurdling roaring" may be output via a surround sound system in the exhibit room rather than a stereo version via the visitor's individual headphones. The respective effect control record and/or the set of "roaring dinosaur" clips may likewise specify that such surround sound output is subject to an "OK" signal from a device held by the tour guide to ensure that no other visitors are accidentally frightened. Such information specific to the dinosaur exhibition may be stored in a venue effect database that complements the effect control records associated with the corresponding natural language text.

While one or more aspects of the teachings have been discussed in the form of a method, one or more aspects of the teachings may be embodied, mutatis mutandis, in the form of a system, e.g. a system for complementing a spoken text, or a computer program product, as will be appreciated by the person skilled in the art.

One or more aspects of the system may be configured and adapted to effect any of the actions described herein with respect to the disclosed aspects. For example, the system may comprise a control component that effects any of the actions described herein.

The system may comprise, for instance, a text data receiving component that receives text data as discussed hereinabove.

The system may comprise, for instance, an effect control data receiving component that receives effect control data as discussed hereinabove.

The system may comprise, for instance, an audio data stream receiving component that receives a stream of data as discussed hereinabove.

The system may comprise, for instance, an audio data stream analyzing component that analyzes a stream of audio data as discussed hereinabove.

The system may comprise, for instance, an effect control signal outputting component that outputs an effect control signal as discussed hereinabove.

The system may comprise, for instance, an effect device information receiving component that receives effect device information as discussed hereinabove.

The system may comprise, for instance, a set of effect devices as discussed hereinabove.

The system may comprise, for instance, a determining component that determines whether a respective location (in a natural language text) is an expected next location as discussed hereinabove.

The system may comprise, for instance, a user input receiving component that receives user inputs as discussed hereinabove.

Any of the aforementioned components of the system may communicate with any other of the aforementioned components of the system. In this respect, the system may comprise one or more communication busses/links interconnecting the respective components.

One or more other aspects relate to an effect-complemented text document. The effect-complemented text document may comprise text data and/or effect control data as described hereinabove. For example, the effect-complemented text document may comprise text data representative of a natural language text and effect control data comprising at least one effect control record, each effect control record being associated with a respective location in said natural language text and specifying at least one of a specific sensory effect and a class of sensory effects.

The effect-complemented text document may be embodied in the form of a tangible storage medium, a non-transitory storage medium or a non-transitory, tangible storage medium. The storage medium may comprise/store text data and effect control data as described hereinabove.

Figure 1:
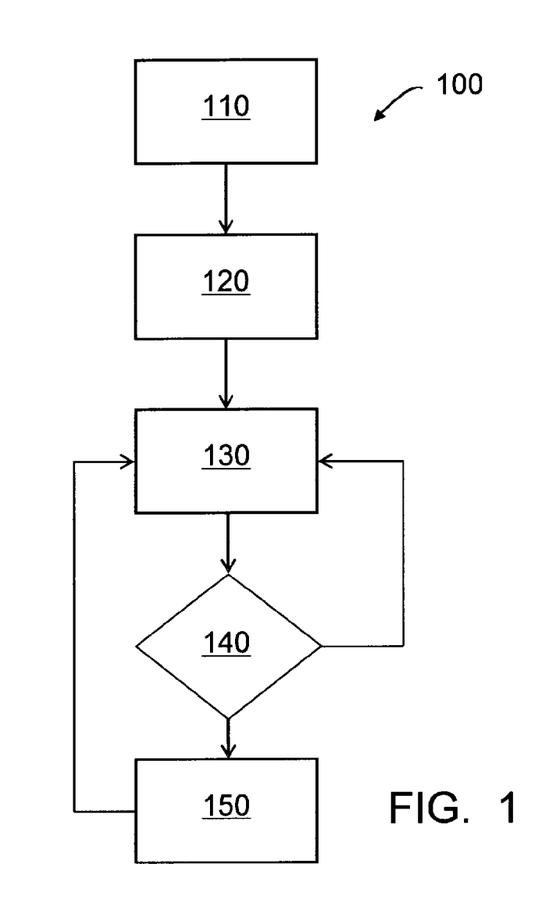
FIG. 1 shows an exemplary flow diagram of an embodiment of a method of complementing spoken text in accordance with an aspect of the present disclosure.

FIG. 1 shows an exemplary flow diagram 100 of an embodiment of a method of complementing spoken text in accordance with the one or more aspects, e.g. as described above.

In the illustrated embodiment, flow diagram 100 comprises a step 110 where text data is received, a step 120 where effect control data is received, a step 130 where a stream of audio data is received (e.g. on an iterative, packet-by-packet basis), a step 140 where the stream of audio data (e.g. a respective packet of the stream of audio data) is analyzed and a step 150 where at least one effect control signal is output. Any of these steps may be effected as described above. For example, the flow may proceed from step 140 to step 150 if it is determined at step 140 that a natural language utterance in the stream of audio data correlates with a respective location in the natural language text that is associated with effect control data. Otherwise, the flow may return to step 130. After step 150, the flow may also return to step 130.

Figure 2:
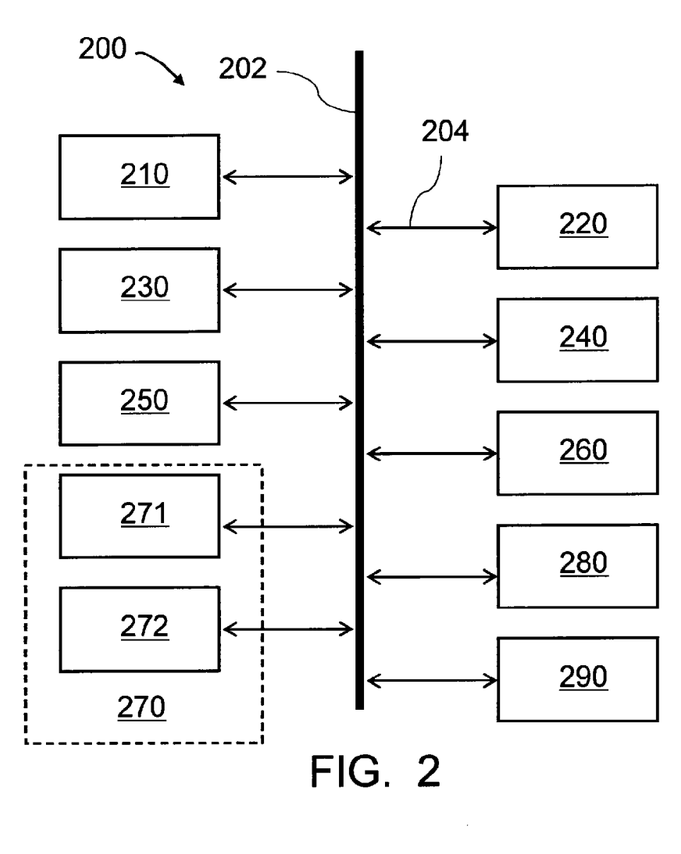
FIG. 2 schematically shows an embodiment of a system for complementing spoken text in accordance with an aspect of the present disclosure.

FIG. 2 schematically shows an embodiment of a system 200 in accordance with one or more aspects, e.g. as described above.

In the illustrated embodiment, system 200 comprises a text data receiving component 210, an effect control data receiving component 220, an audio data stream receiving component 230, an audio data stream analyzing component 240, an effect control signal outputting component 250, an effect device information receiving component 260, a set of effect devices 270 comprising effect devices 271 and 272, a determining component 280, a user input receiving component 290 as well as a communication bus 202 comprising a plurality of communication links 204 (for the sake of legibility, only one of the communication links bears a reference sign). Communication bus 202 and the communication links 204 communicatively interconnect the aforementioned components 210-290. As discussed above, the system may moreover comprise a control component (not shown).

Figure 3:
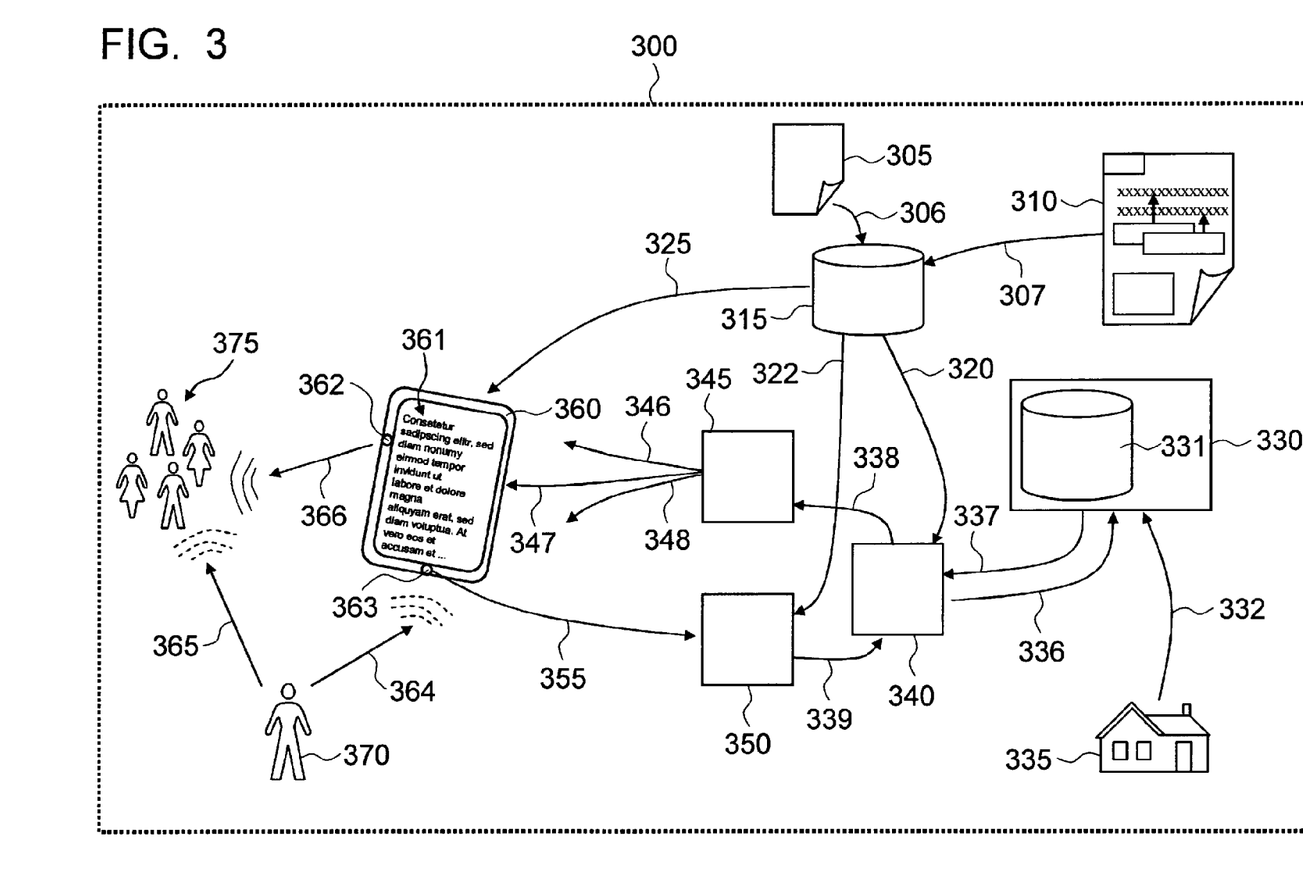
FIG. 3 schematically shows another embodiment of a system for complementing spoken text in accordance with an aspect of the present disclosure.

FIG. 3 schematically shows another embodiment of a system 300 for complementing spoken text in accordance with one or more aspects, e.g. as described above.

In the illustrated embodiment, system 300 comprises an effect handler 340 and a voice scanner 350. Any of the other features shown in FIG. 3 may optionally constitute a feature of system 300.

In the illustrated embodiment, a content library 315 may store a conventional text document 305 received in the form of a data signal 306 as well as an effect-complemented text document 310 received in the form of a data signal 307. Effect-complemented text document (EDOC) 310 may be communicated to a smart communication device 360 in the form of a data signal 325, where a natural language text stored within effect-complemented text document 310 is presented to a speaker 375 on a screen of smart communication device 360 as content output 361. Speech 364, 365 from speaker 370 is heard by an audience 375, captured by a microphone 363 of smart communication device 360 and communicated in the form of a voice feedback signal 355 to voice scanner 350 where it is received by an audio data stream receiving component 230 built into voice scanner 350. Voice scanner 350 comprises an audio data stream analyzing component 240 having voice recognition capabilities. Voice scanner 350 comprises a text data receiving component 210 that receives effect-complemented text document 310 from content library 315 in the form of a data signal 322. Voice scanner 350 compares the speech recognized from voice feedback signal 355 with text data in effect-complemented text document 310 and outputs a data signal 339 indicative of the current position in the text (PiT). Effect handler 340 comprises an effect control data receiving component 220 that receives effect-complemented text document 310 from content library 315 in the form of a data signal 320. Based on the PiT-information received from voice scanner 350 and effect control data in effect-complemented text document 310, effect handler 340 communicates effect information 336 including e.g. an effect ID, an effect type and an effect variant associated with the current PiT to a server 330, e.g. an FEM server (FEM=feedback effect mapping). Server 330 receives location information 335 in the form of a data signal 332 and stores location information 335 in a database 331, e.g. an effects mapping database. In response to effect information 336, server 330 supplies additional effect information 337. Based on additional effect information 337, effect handler 340 outputs one or more effect control signals 338 to an effect output controller 345 that outputs effect device control signals 346-348 to individual effect devices, e.g. to smart communication device 360 that acts as an effect device. In response to effect device control signal 347, smart communication device 360 outputs an audio effect 366 via a loudspeaker 362 built into smart communication device 360.

Figure 4:
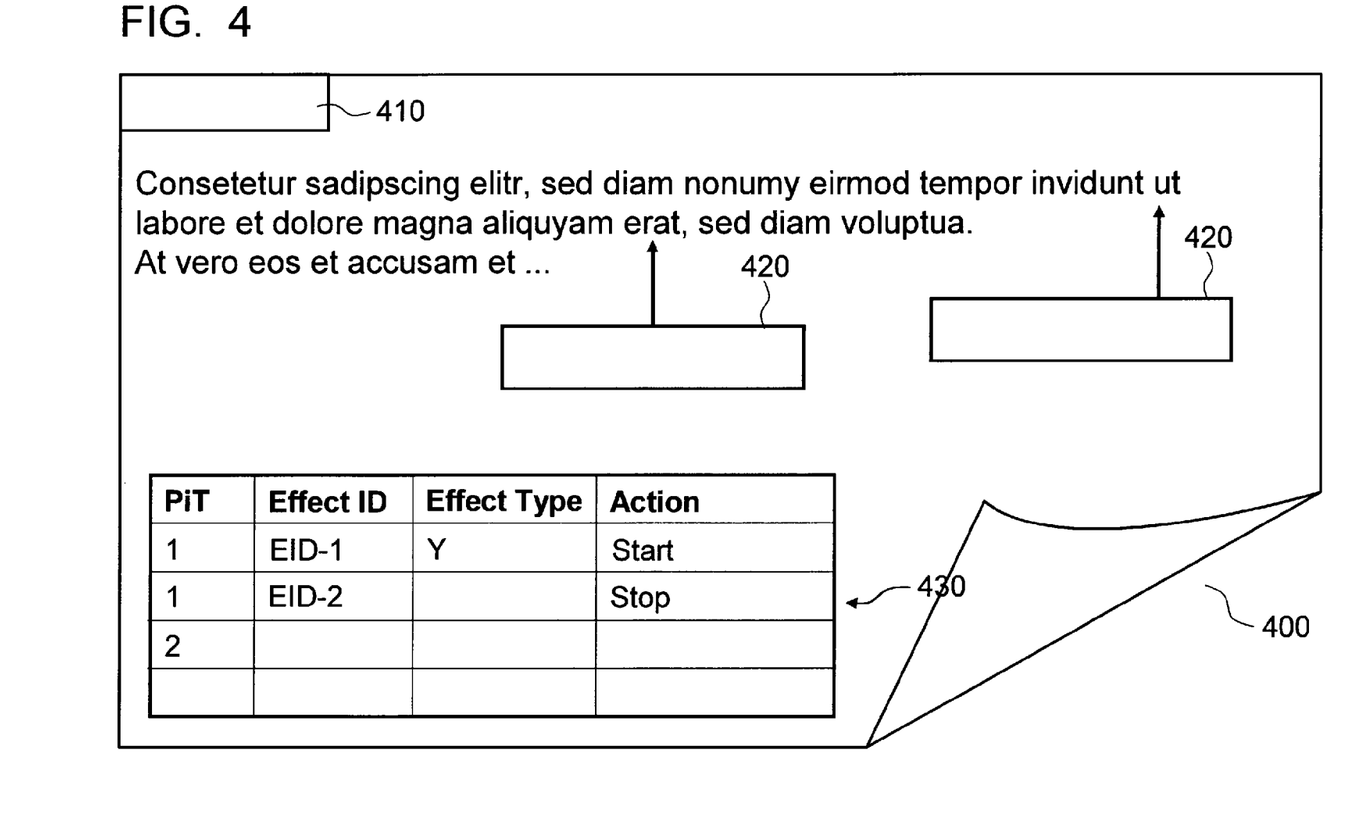
FIG. 4 schematically shows an embodiment of an effect-complemented text document in accordance with an aspect of the present disclosure.

FIG. 4 schematically shows an embodiment of an effect-complemented text document (EDOC) 400 in accordance with one or more aspects, e.g. as described above.

EDOC 400 comprises a natural language text, a content ID 410, a plurality of effect markers 420 and an embedded effect control table (EECT) 430. EDOC 400 is (e.g., uniquely) identified by content ID 410. Electronic text stored in EDOC 400 is enriched by additional information to implement feedback event mapping functionality. Effect markers 420 at certain positions in the text (PiT) associate certain parts of the electronic text with effect ID's stored in embedded effect control table 430 that refers to effects and their processing parameters.

Figure 5:
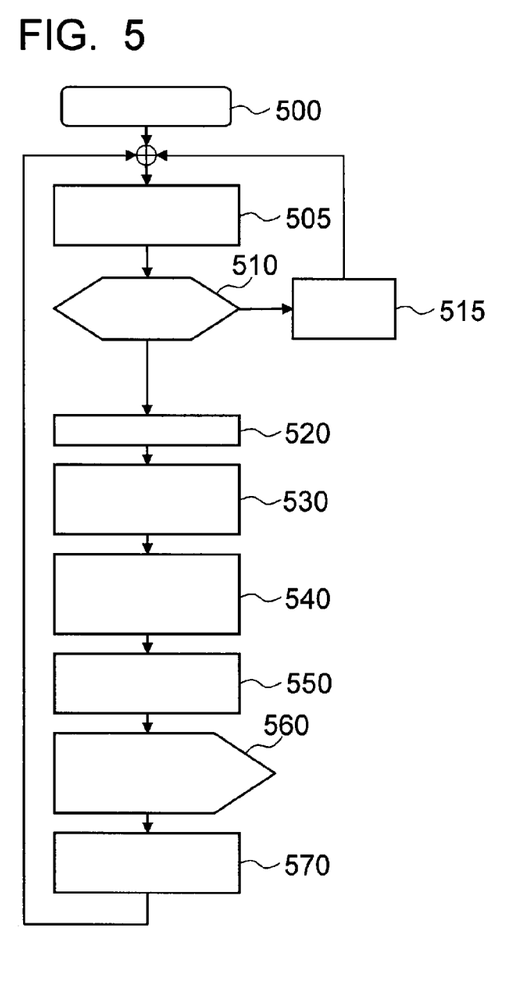
FIG. 5 shows an exemplary flow diagram of an embodiment of an initialization process for a method of complementing spoken text in accordance with an aspect of the present disclosure.

FIG. 5 shows an exemplary flow diagram of an embodiment of an initialization process for a method of complementing spoken text in accordance with one or more aspects, e.g. as described above.

The flow diagram begins at step 500. At step 505, a user selects content from a content library. As part of the initializing process, the type of the content is determined at step 510. If the content type does not match an EDOC format, conventional handling of the content, i.e. of the electronic document is performed at step 515, otherwise processing of the EDOC is started at step 520. After retrieval of the content ID 410 of EDOC 400 at step 520, effect handler 340 reads the embedded effect control table (EECT) 430 from EDOC 400 at step 530. Using the data contained in EECT 430, effect handler 340 retrieves all available effect variants from FEM server 330 and builds a user-selectable option list at step 540. Using the option list, the user selects none or more effect variants at step 550. After selection of the effect variants, an effect handler process is started at step 560 and the processing of the electronic document part of EDOC 400, i.e. the text or "DOC" part, is started at step 570.

Figure 6:
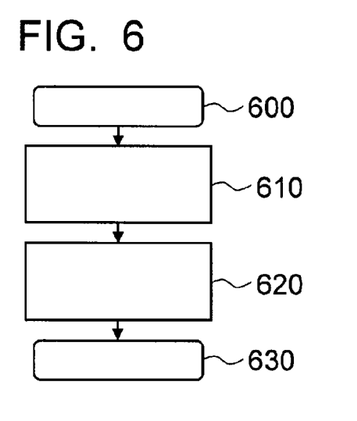
FIG. 6 shows an exemplary flow diagram of an embodiment of an optional pre-setting process for a method of complementing spoken text in accordance with an aspect of the present disclosure.

FIG. 6 shows an exemplary flow diagram of an embodiment of an optional pre-setting process for a method of complementing spoken text in accordance with one or more aspects, e.g. as described above.

In addition to the manual effect variant selection described with reference to FIG. 5, a pre-setting of effect variants may be carried out. Such a process begins at step 600. A certain set of effect variants are pre-selected at step 610 and substitution of missing effects listed in EECT 430 is executed at step 620. The process stops at step 630.

Figure 7:
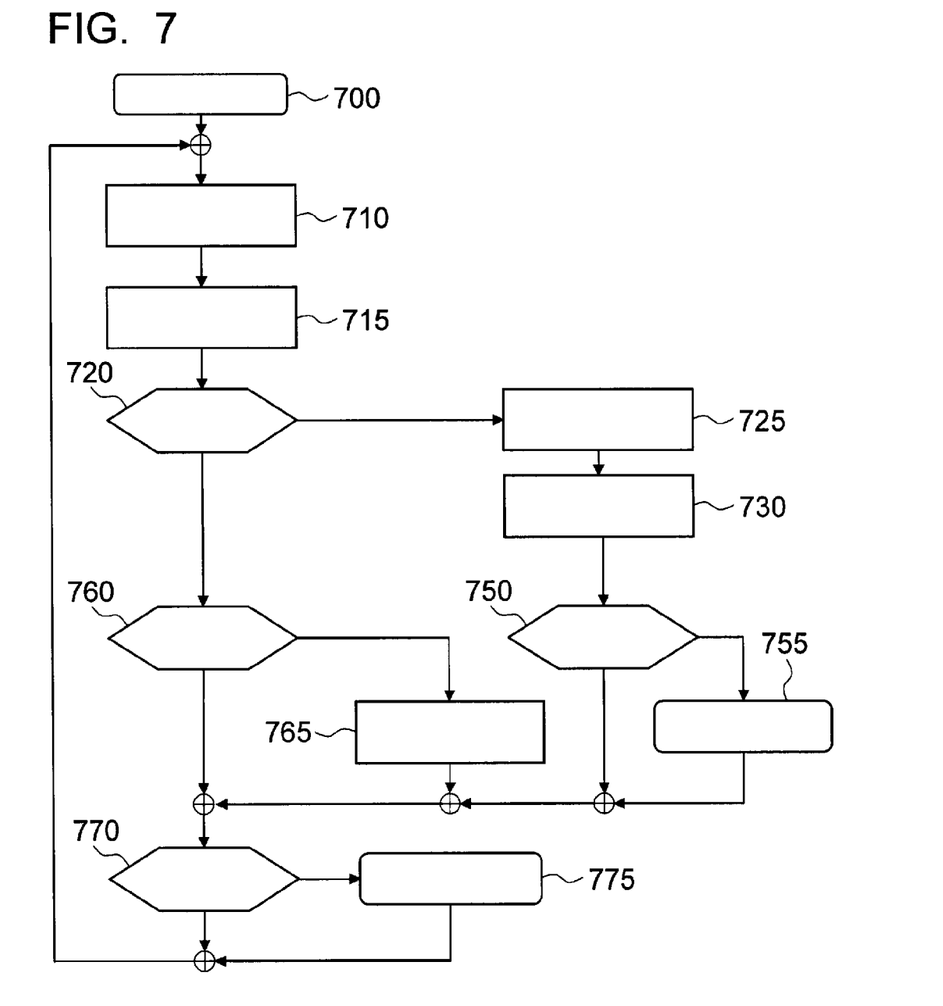
FIG. 7 shows an exemplary flow diagram of an embodiment of an effect handling process for a method of complementing spoken text in accordance with an aspect of the present disclosure.

FIG. 7 shows an exemplary flow diagram of an embodiment of an effect handling process for a method of complementing spoken text in accordance with one or more aspects, e.g. as described above, in particular an "effect handler" process as started at step 560.

The exemplary effect handling process begins at step 700. Effect handler 340 receives the current PiT in EDOC 400 at step 710 and gets the effect information (e.g. effect ID, effect type, effect action) from EECT 430 for that PiT at step 715. If it is determined at step 720 that the current PiT is not the successor of the last PiT, e.g. skipping parts in the document, all currently running effects are stopped at step 725. Effect handler 340 searches at step 730 for effects in EDOC 400 that are started before the PiT and are stopped after PiT. If it determines at step 750 that such effects were found, effect handler 340 starts those effects at step 755. Otherwise the process continues at step 770. If it is determined at step 720 that the current PiT is the successor of the last PiT, effect handler 340 checks if the effect information contains "stop" at step 760. If it contains "stop", the corresponding effect is stopped at step 765. Effect handler 340 checks if the effect information contains "start" at step 770. If it contains "start", effect handler 340 starts the effects at step 775. The process then returns to step 710.

Figure 8:
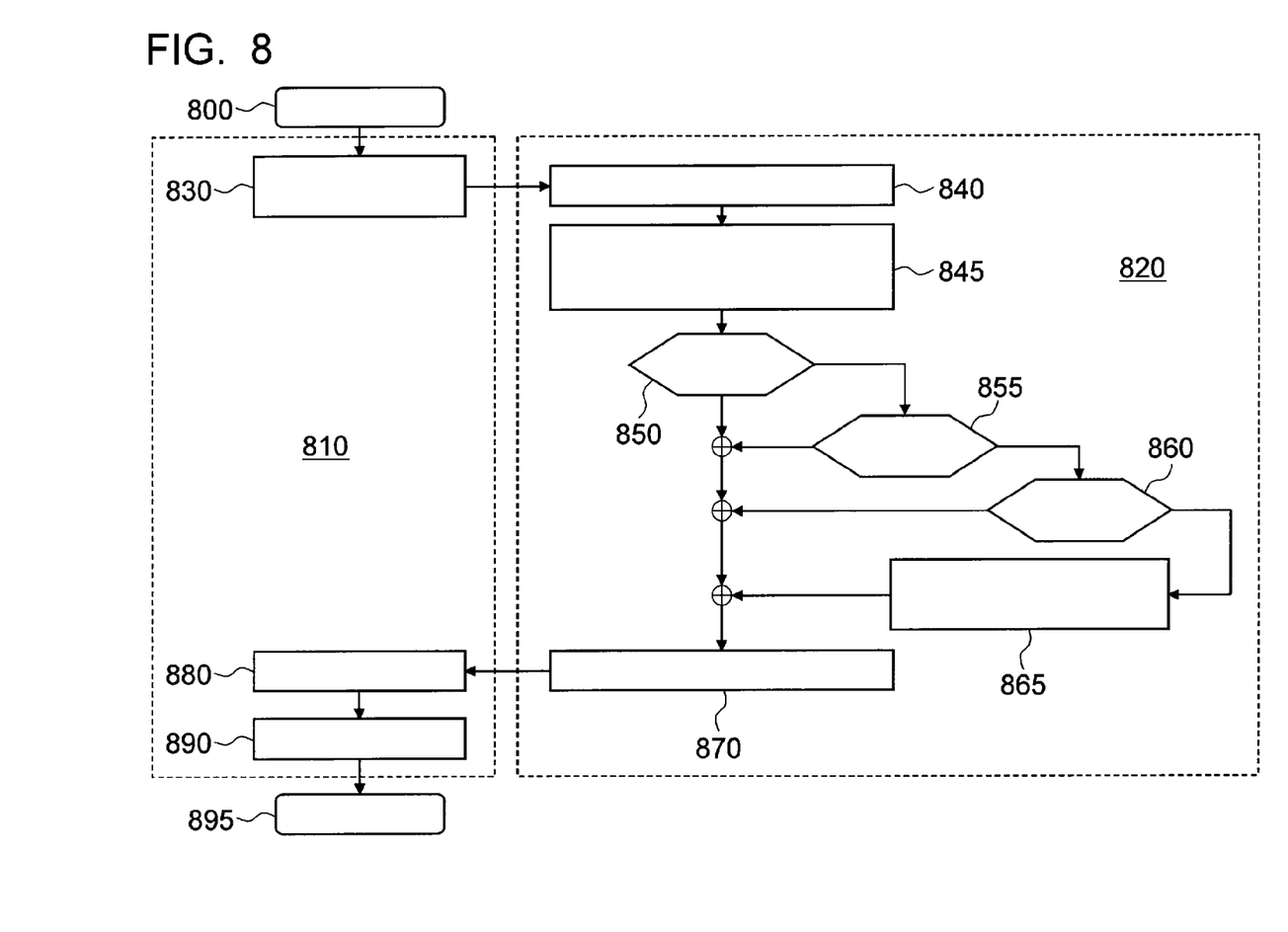
FIG. 8 shows an exemplary flow diagram of an embodiment of an effect control process for a method of complementing spoken text in accordance with an aspect of the present disclosure.

FIG. 8 shows an exemplary flow diagram of an embodiment of an effect control process for a method of complementing spoken text in accordance with one or more aspects, e.g. as described above, in particular a "start effect" process as started at steps 755 and 775.

The exemplary effect control process begins at step 800. At step 830, effect handler 340, 810 sends effect information (e.g. effect ID, effect type and effect variant information) to Feedback Effect Mapping (FEM) server 330, 820. FEM Sever 330, 820 receives the effect information (e.g. effect ID, effect type and effect variant information) at step 840. At step 845, FEM server 330, 820 gets/creates a list of registered effects for the given effect information (e.g. effect ID, effect type and effect variant information) from the effect mapping DB 331. If it is determined at step 850 that a location-based effect is enabled and it is determined at step 855 that the current location is eligible for a location-based effect and it is determined at step 860 that a location-based effect exists in the effect mapping DB, then the location-based effects are added to the list of effects at step 865. Then the process continues at step 870. If any of the determinations at steps 850, 855 and 860 are negative, the process continues at step 870 without enacting step 865. At step 870, FEM server 330, 820 sends the list of effects to effect handler 340, 810. At step 880, effect handler 340, 810 receives the list of effects and, at step 890 triggers the effects of the list. The process stops at step 895.

Figure 9:
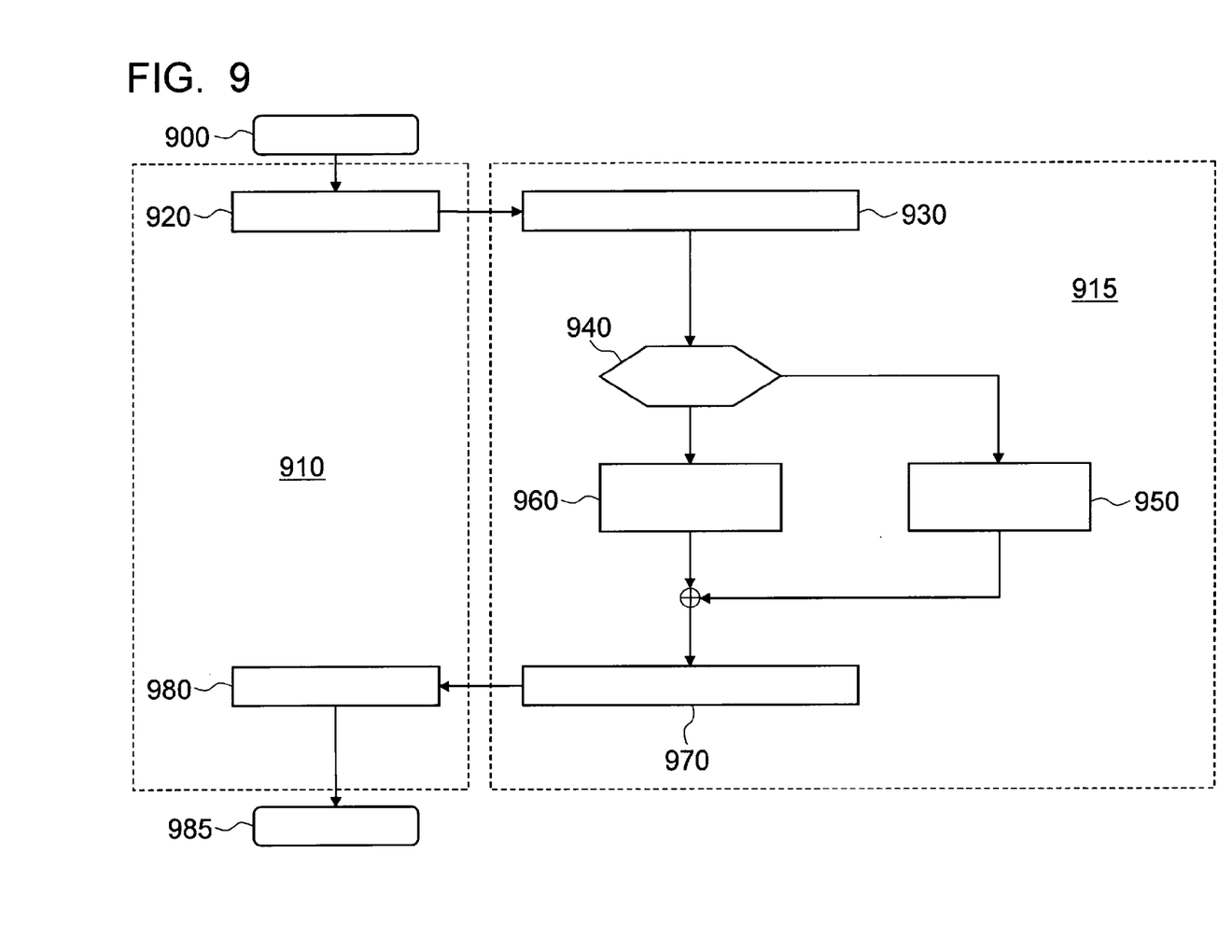
FIG. 9 shows an exemplary flow diagram of an embodiment of an effect device registration process for a method of complementing spoken text in accordance with an aspect of the present disclosure.

FIG. 9 shows an exemplary flow diagram of an embodiment of an effect device registration process for a method of complementing spoken text in accordance with one or more aspects, e.g. as described above.

The process begins at step 900. At step 920, an effect device 910 sends device information (e.g. an effect device ID and/or a list of effect types that effect device 910 is capable of handling) to FEM server 330, 915. At step 930, FEM server 330, 915 receives the device information. If it is determined at step 940 that the effect device ID is known to the FEM Server, then the device is added to the location-based effects for the effect types at step 950 and the registration is successful. Otherwise registration of effect device 910 is rejected at step 960. At step 970, FEM server 330, 915 sends registration information (e.g. successful/rejected) to effect device 910. At step 980, effect device 910 receives the registration information. The process stops at step 985.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present disclosure, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of aspects of the present invention has been presented for purposes of illustration and description, but is not intended to be exhaustive or limited to the invention in the form disclosed. Many modifications and variations will be apparent to those of ordinary skill in the art without departing from the scope and spirit of aspects of the invention. The embodiment was chosen and described in order to best explain the principles of aspects of the invention and the practical application, and to enable others of ordinary skill in the art to understand aspects of the invention for various embodiments with various modifications as are suited to the particular use contemplated.

What is claimed is:

1. A method of complementing a spoken text, said method comprising:
    receiving text data representative of a natural language text;
    receiving effect control data comprising at least one effect control record, each effect control record being associated with a respective location in said natural language text;
    receiving a stream of audio data;
    analyzing said stream of audio data as the stream of audio data is received for natural language utterances that correlate with said natural language text at a respective one of said locations; and
    outputting, in response to a determination by said analyzing that a natural language utterance in said stream of audio data correlates with a respective one of said locations, at least one effect control signal based on the effect control record associated with the respective location.

2. The method of claim 1, wherein each of said effect control records specifies at least one of an effect ID, an effect type and an effect action.

3. The method of claim 1, further comprising:
receiving effect device information from at least one effect device, wherein said outputting comprises determining, based on said effect device information, whether an effect specified by the effect control record associated with the respective location is available via said at least one effect device.

4. The method of claim 1, further comprising effecting, on at least one effect device, an action specified by said effect control signal.

5. The method of claim 4, wherein said effect device is at least one of an audio output device, a display device, a visual effect output device, a haptic output device, an olfactory output device, a heating device, a cooling device, a moving platform, a cell phone, a portable audio reproduction device, and a tablet computing device.

6. The method of claim 1, further comprising:
determining, based on said effect control data and in response to said determination that a natural language utterance in said stream of audio data correlates with a respective one of said locations, whether said respective location is an expected next location, wherein based on said determining determines that said respective location is not said expected next location, said outputting comprises outputting, for at least one running effect, a control signal to stop the respective running effect.

7. The method of claim 1, wherein said stream of audio data is a real-time stream of audio data.

8. The method of claim 1, wherein the stream of audio data is received as it is spoken.

9. The method of claim 1, wherein the stream of audio data is received via a microphone.

10. A system for complementing a spoken text, said system comprising:
a text data receiving component that receives text data representative of a natural language text;
an effect control data receiving component that receives effect control data comprising at least one effect control record, each effect control record being associated with a respective location in said natural language text;
an audio data stream receiving component that receives a stream of audio data;
an audio data stream analyzing component that analyzes said stream of audio data as the stream of audio data is received for natural language utterances that correlate with said natural language text at a respective one of said locations; and
an effect control signal outputting component that outputs, in response to a determination by said audio data stream analyzing component that a natural language utterance in said stream of audio data correlates with a respective one of said locations, at least one effect control signal based on the effect control record associated with the respective location.

11. The system of claim 10, comprising:
an effect device information receiving component that receives effect device information from at least one effect device, wherein said outputting comprises determining, based on said effect device information, whether an effect specified by the effect control record associated with the respective location is available via said at least one effect device.

12. The system of claim 10, further comprising:
a set of effect devices, wherein at least one of said set of effect devices receives an effect control signal and effects an action specified by said effect control signal, wherein said at least one of said set of effect devices is at least one of an audio output device, a display device, a visual effect output device, a haptic output device, an olfactory output device, a heating device, a cooling device and a moving platform.

13. The system of claim 10, further comprising:
a determining component that determines, based on said effect control data and in response to said determination that a natural language utterance in said stream of audio data correlates with a respective one of said locations, whether said respective location is an expected next location, wherein based on said determining component determines that said respective location is not said expected next location, said outputting comprises outputting, for at least one running effect, a control signal to stop the respective running effect.

14. The system claim 10, wherein said stream of audio data is a real-time stream of audio data.

15. A computer program product for complementing a spoken text, said computer program product comprising:
a non-transitory computer readable storage medium readable by a processing circuit and storing instructions for execution by the processing circuit for performing a method comprising:
receiving text data representative of a natural language text;
receiving effect control data comprising at least one effect control record, each effect control record being associated with a respective location in said natural language text;
receiving a stream of audio data;
analyzing said stream of audio data as the stream of audio data is received for natural language utterances that correlate with said natural language text at a respective one of said locations; and
outputting, in response to a determination by said analyzing that a natural language utterance in said stream of audio data correlates with a respective one of said locations, at least one effect control signal based on the effect control record associated with the respective location.

16. The computer program product of claim 15, wherein each of said effect control records specifies at least one of an effect ID, an effect type and an effect action.

17. The computer program product of claim 15, wherein the method further comprises:
receiving effect device information from at least one effect device, wherein said outputting comprises determining, based on said effect device information, whether an effect specified by the effect control record associated with the respective location is available via said at least one effect device.

18. The computer program product of claim 15, wherein the method further comprises effecting, on at least one effect device, an action specified by said effect control signal, and wherein said effect device is at least one of an audio output device, a display device, a visual effect output device, a haptic output device, an olfactory output device, a heating device, a cooling device, a moving platform, a cell phone, a portable audio reproduction device, and a tablet computing device.

19. The computer program product of claim 15, wherein the method further comprises:

determining, based on said effect control data and in response to said determination that a natural language utterance in said stream of audio data correlates with a respective one of said locations, whether said respective location is an expected next location, wherein based on said determining determines that said respective location is not said expected next location, said outputting comprises outputting, for at least one running effect, a control signal to stop the respective running effect.

20. The computer program product of claim 15, wherein said stream of audio data is a real-time stream of audio data.

\* \* \* \* \*